United States Patent
Hamilton et al.

(10) Patent No.: US 12,545,796 B2
(45) Date of Patent: Feb. 10, 2026

(54) INK COMPOSITIONS

(71) Applicants: John Hamilton, Shropshire (GB);
Andrew McVitie, Shropshire (GB);
Derek Smith, Shropshire (GB);
Samantha Davies, Shropshire (GB)

(72) Inventors: John Hamilton, Shropshire (GB);
Andrew McVitie, Shropshire (GB);
Derek Smith, Shropshire (GB);
Samantha Davies, Shropshire (GB)

(73) Assignee: Ricoh Company, Ltd., Tokyo (JP)

( * ) Notice: Subject to any disclaimer, the term of this patent is extended or adjusted under 35 U.S.C. 154(b) by 915 days.

(21) Appl. No.: 17/755,895

(22) PCT Filed: Nov. 25, 2020

(86) PCT No.: PCT/JP2020/043880
§ 371 (c)(1),
(2) Date: May 11, 2022

(87) PCT Pub. No.: WO2021/106950
PCT Pub. Date: Jun. 3, 2021

(65) Prior Publication Data
US 2022/0380614 A1 Dec. 1, 2022

(30) Foreign Application Priority Data
Nov. 27, 2019 (GB) .................................... 1917277

(51) Int. Cl.
| | | |
|---|---|---|
| C09D 11/326 | (2014.01) | |
| C09D 11/033 | (2014.01) | |
| C09D 11/037 | (2014.01) | |
| C09D 11/105 | (2014.01) | |
| C09D 11/36 | (2014.01) | |
| G06K 1/12 | (2006.01) | |

(52) U.S. Cl.
CPC .......... *C09D 11/326* (2013.01); *C09D 11/033* (2013.01); *C09D 11/037* (2013.01); *C09D 11/105* (2013.01); *C09D 11/36* (2013.01); *G06K 1/121* (2013.01)

(58) Field of Classification Search
CPC ... C09D 11/326; C09D 11/033; C09D 11/037; C09D 11/105; C09D 11/36; G06K 1/121
USPC ........................................................ 524/318
See application file for complete search history.

(56) References Cited

U.S. PATENT DOCUMENTS

| | | |
|---|---|---|
| 5,904,759 A | 5/1999 | Okuda et al. |
| 6,527,845 B1 | 3/2003 | Tsuchiya et al. |
| 2005/0223939 A1 | 10/2005 | Uozumi et al. |
| 2010/0086693 A1 | 4/2010 | Yamada et al. |
| 2016/0264804 A1 | 9/2016 | Kumeta et al. |

FOREIGN PATENT DOCUMENTS

| | | | |
|---|---|---|---|
| EP | 0984047 | 3/2000 | |
| EP | 1344802 | 9/2003 | |
| EP | 1790697 | 5/2007 | |
| EP | 1790697 A1 * | 5/2007 | ......... C09B 67/0046 |
| KR | 100655764 B1 * | 1/2006 | |
| KR | 100655764 | 12/2006 | |

OTHER PUBLICATIONS

International Search Report Issued on Mar. 9, 2021 in PCT/JP2020/043880 filed on Nov. 25, 2020.
Russian Office Action dated Jan. 10, 2023, in Russian Application No. 2022113557, with English translation, 15 pages.
Chinese Office Action issued in Chinese Patent Application No. 202080081162.6, on Nov. 19, 2024, 15 pages (with English translation).
Ink Manufacturing Process writing group: "Ink Manufacturing Process," China Light Industry Press, pp. 223 and 267, 2nd printing, 2nd version, May 1993.

* cited by examiner

*Primary Examiner* — Kelechi C Egwim
(74) *Attorney, Agent, or Firm* — Grüneberg and Myers PLLC

(57) ABSTRACT

An ink composition contains a semi-drying solvent; a pigment; an alkyd resin; and an amine-based polymeric dispersant. The composition contains 5 wt % or more of the alkyd resin, based on the total weight of the composition, and 5 wt % or more of the amine-based polymeric dispersant, based on the total weight of the composition.

19 Claims, No Drawings

INK COMPOSITIONS

CROSS-REFERENCE TO RELATED APPLICATIONS

This application is the National Stage entry under § 371 of International Application No. PCT/JP2020/043880, filed on Nov. 25, 2020, and which claims the benefit of priority to United Kingdom Application No. GB 1917277.4, filed on Nov. 27, 2019.

The content of each of these applications is hereby incorporated by reference in its entirety.

TECHNICAL FIELD

The present invention relates to ink compositions, and methods of manufacturing the ink composition.

BACKGROUND ART

Inkjet printing is used in a variety of printing applications, and can provide high resolution images on a range of substrates. In recent years, producers and consumers of articles on which images may be printed, such as for example packaging, have increasingly recognised the importance of such articles being recyclable, compostable and/or biodegradable. Direct printing can avoid the use of labels, which hinder the recycling of package. In instances where a printed image may contain optically-readable data, such as for example a 1D or 2D optically-readable code printed on packaging, it is important for the ink to allow for direct printing of the image in sufficiently high resolution, and in a manner sufficiently free from spreading or blurring, for the image to be reliably decoded. The problem of ink spreading or blurring is particularly evident when the article on which the image is to be printed is a low-quality substrate, such as brown containerboard. Inkjet printing is advantageous because it allows variable data to printed in production line situations.

SUMMARY OF INVENTION

Technical Problem

It remains a particular problem to provide a biodegradable ink which can be inkjet printed in a manner sufficiently free from spreading or blurring, even on low quality substrates.

Solution to Problem

The present invention provides an ink composition comprising: a semi-drying solvent; a pigment; an alkyd resin; and an amine-based polymeric dispersant, wherein 5 wt % or more of the alkyd resin, based on the total weight of the composition, is contained, and wherein 5 wt % or more of the amine-based polymeric dispersant, based on the total weight of the composition, is contained.

The present invention yet further provides a method of manufacturing an ink composition comprising providing a semi-drying solvent, a pigment, an alkyd resin, and a dispersant, wherein the alkyd resin is provided in an amount of 5 wt % or more, based on the total weight of the composition; and the dispersant is provided in an amount of 5 wt % or more, based on the total weight of the composition.

The present inventors have surprisingly found that when a semi-drying solvent is used in an ink composition in combination with an alkyd resin and an amine-based polymeric dispersant, in the amounts described above, a biodegradable ink can be obtained which is reliably capable of being inkjet printed in a manner sufficiently free from spreading or blurring, even on low quality substrates.

DESCRIPTION OF EMBODIMENTS

The ink composition of the invention comprises a semi-drying solvent. The term semi-drying solvent is a term of art and relates to the type of solvent present in the ink composition. It does not relate to the state or dryness of the composition. Semi-drying solvents are discussed in more detail in Surface Coatings Vol I—Raw Materials and Their Usage by the Oil and Colour Chemists Association of Australia (1983); § 3.2.4.

As used herein, a semi-drying solvent is may be a solvent with an iodine value of 120 to 150. The iodine value of a solvent is a parameter well understood in the field of ink raw materials and is defined as the number of grams of iodine absorbed by 100 grams of oil. The iodine value is determined by the chemical structure of the components of the solvent, and is a measure of unsaturation by determination of the amount of iodine absorbed or reacted at the double bonds. Iodine values are discussed in more detail in Surface Coatings Vol I—Raw Materials and Their Usage by the Oil and Colour Chemists Association of Australia (1983); § 3.2.7. The iodine value of a solvent can be determined by well-known methods, such as those discussed in Surface Coatings Vol I—Raw Materials and Their Usage by the Oil and Colour Chemists Association of Australia (1983); § 3.2.7.

In preferred embodiments of the ink compositions of the present invention, the semi-drying solvent is present in an amount of 64 to 80 wt %, based on the total weight of the composition. In particularly preferred embodiments of the ink compositions of the present invention, the semi-drying solvent is present in an amount of 70 to 75 wt %, based on the total weight of the composition.

The semi-drying solvent may comprise an ester (hereinafter referred to as a first ester). The first ester is derived from an acid (hereinafter the acid component of the first ester) and an alcohol (hereinafter the alcohol component of the first ester).

In some embodiments, the acid component of the first ester is an unsaturated fatty acid. Preferably the acid component of the first ester is a di-unsaturated fatty acid. Di-unsaturated fatty acids may be obtained, for example, by hydrolysis of vegetable oils (e.g. soy oil). Examples of suitable di-unsaturated fatty acids include linoleic acid, eicosadienoic acid, and docosadienoic acid. Linoleic acid is preferred as the acid component of the first ester. Linoleic acid can be obtained by hydrolysis of soy oil.

In some embodiments, the alcohol component of the first ester is a monohydric alcohol. Examples of suitable monohydric alcohols include methanol, ethanol, n-propanol, isopropanol, n-butanol, i-butanol and t-butanol. Methanol is preferred as the alcohol component of the first ester.

The first ester may be an ester of a di-unsaturated fatty acid and a monohydric alcohol, and examples of the first ester include methyl esters such as linoleic acid methyl ester, eicosadienoic acid methyl ester, docosadienoic acid methyl ester and and linolelaidic acid. Linoleic acid methyl ester is preferred as the first ester.

The semi-drying solvent may be a single substance, or a mixture of different substances. The one or more further substances may be other esters (e.g. other esters of fatty acids, including unsaturated and saturated fatty acids, and monohydric alcohols), or other substances of the types commonly found in solvents for inkjet ink compositions. When the semi-drying solvent is a mixture of the first ester and one or more further substances, the first ester may be present in an amount of 50 wt % or more of the semi-drying solvent, with reference to the amounts of the semi-drying solvent discussed above (e.g. 32 wt % or more, or 44 wt % or more of the ink composition).

The present inventors have found that a semi-drying solvent (e.g. the semi-drying solvents described above), when used in combination with the other components of the ink composition described herein and in the amounts described herein, has advantages in that it is biodegradable and is suitable for inkjet printing in a manner sufficiently free from spreading or blurring, even on low quality substrates.

The ink composition of the present invention comprises a pigment. The pigment used in the ink composition of the present invention is not particularly limited. In some embodiments, the pigment is a black pigment. In some embodiments the pigment is a coloured pigment (i.e. a non-black pigment, such as cyan, magenta or yellow).

In preferred embodiments of the ink composition of the present invention, the pigment is present in an amount of 10 to 18 wt %, based on the total weight of the composition. In particularly preferred embodiments, the pigment is present in an amount of 13 to 15 wt %, based on the total weight of the composition.

The black pigment which may be used in the ink composition of the present invention is not particularly limited. The black pigment may for example be a carbon black pigment. Examples of carbon black pigments which can be used in the ink composition of the present invention include REGAL(r) series (e.g. REGAL(r) 400R, REGAL(r) 660R), EMPEROR(r) series (e.g. EMPEROR(r) 1600, EMPEROR(r) 1800), MONARCH(r) series (MONARCH(r) 800), VULCAN(r) series (e.g. VULCAN(r) XC72R) available from Cabot Corporation, Birla N330, available from Birla Carbon, and black pigments from the Raven range available from Columbian Chemicals Company.

The ink composition of the present invention comprises an alkyd resin. In some embodiments, the ink composition of the present invention is present in an amount of 7 wt % or more. In preferred embodiments of the ink composition of the present invention the alkyd resin is present in an amount of 5 to 9 wt %, based on the total weight of the composition. In some preferred embodiments, the alkyd resin is present in amount of 5 wt % to 8 wt %, based on the total weight of the composition. In particularly preferred embodiments, the alkyd resin is present in an amount of 6 to 8 wt %, based on the total weight of the composition.

As used herein, an alkyd resin comprises an ester (hereinafter referred to as a second ester). The second ester is derived from an acid (hereinafter the acid component of the second ester) and an alcohol (hereinafter the alcohol component of the second ester).

In some embodiments, the acid component of the second ester is an unsaturated fatty acid. Preferably the acid component of the second ester is a di-unsaturated fatty acid. Di-unsaturated fatty acids may be obtained, for example, by hydrolysis of vegetable oils (e.g. soy oil). Examples of suitable di-unsaturated fatty acids include linoleic acid, eicosadienoic acid, docosadienoic acid and linolelaidic acid. Linoleic acid is preferred as the acid component of the second ester. Linoleic acid can be obtained by hydrolysis of soy oil.

In some embodiments, the alcohol component of the second ester is a polyhydric alcohol. Examples of suitable polyhydric alcohols include glycerol, trimethylolpropane, and pentaerythritol. Pentaerythritol is preferred as the alcohol component of the second ester.

The second ester may be an ester of a di-unsaturated fatty acid and a polyhydric alcohol, and examples of the second ester include glyceryl esters of linoleic acid (e.g. glyceryl monolinleaate, glyceryl dilonleate, glyceryl trilinoleate, or any mixture thereof), glyceryl esters of eicosadienoic acid (e.g. glyceryl monoeicosadienoate, glyceryl dieicosadienoate, glyceryl trieicosadienoate or any mixture thereof), trimethylolpropyl esters of linoleic acid (e.g. trimethylolpropyl monolinoleate, trimethylolpropyl dilinoleate, trimethylolpropyl trilinoleate or any mixture thereof), trimethylolpropyl esters of eicosadienoic acid (e.g. trimethylolpropyl monoeicosadienoate, trimethylolpropyl dieicosadienoate, trimethylolpropyl trieicosadienoate or any mixture thereof), trimethylolpropyl esters of docosadienoic acid (e.g. trimethylolpropyl monodocosadienoate, trimethylolpropyl didocosadienoate, trimethylolpropyl tridocosadienoate or any mixture thereof), pentaerythrityl esters of linoleic acid (e.g. pentaerythrityl monolinoleate, pentaerythrityl dilinoleate, pentaerythrityl trilinoleate, pentaerythrityl tetralinoleate, or any mixture thereof), pentaerythrityl esters of eicosadienoic acid (e.g. pentaerythrityl monoeicosadienoate, pentaerythrityl dieicosadienoate, pentaerythrityl trieicosadienoate, pentaerythrityl tetraeicosadienoate, or any mixture thereof), and pentaerythrityl esters of docosadienoic acid (e.g. pentaerythrityl monodocosadienoate, pentaerythrityl didocosadienoate, pentaerythrityl tridocosadienoate, pentaerythrityl tetradocosadienoate, or any mixture thereof). Pentaerythrityl esters of tetralinoleic acid are preferred as the second ester. Mixtures comprising pentaerythrityl monolinoleate and pentaerythrityl dilinoleate are particularly preferred.

The alkyd resin may be a single substance, or a mixture of different substances. The one or more further substances may be other esters (e.g. other esters of unsaturated fatty acids and polyhydric alcohols), or other substances of the types commonly found in alkyd resins. When the alkyd resin is a mixture of the second ester and one or more further substances, the second ester may be present in an amount of 50 wt % or more of the semi-drying solvent (i.e. 2.5 to 4.5 wt % or more of the ink composition).

The present inventors have found that an alkyd resin (e.g. the alkyd resin described above), when used in combination with the other components of the ink composition described herein and in the amounts described herein, has advantages in that it improves the stability and/or viscosity of the ink composition.

The ink composition of the present invention comprises 5 wt % or more of an amine-based polymeric dispersant. In preferred embodiments, the ink composition of the invention comprises 5 to 9 wt % of the amine-based polymeric dispersant, based on the total weight of the composition. In some preferred embodiments, the ink composition of the invention comprises 5 to 8 wt % of the amine-based polymeric dispersant, based on the total weight of the composition. In particularly preferred embodiments, the dispersant is present in an amount of 6 to 8 wt %, based on the total weight of the composition.

Suitable amine-based polymeric dispersants comprise an amine-based polymeric component. In some embodiments the amine-based polymeric dispersant may consist of an amine-based polymeric component. In other embodiments the amine-based polymeric dispersant may comprise an amine-based polymeric component and may further comprise an organic medium. The amine-based polymeric dispersant may comprise the amine-based polymeric component in an amount of from 30 to 50 wt %, or about 40 wt %, of the dispersant (e.g. up to 4.5 wt %, or about 2.0 to about 3.6 wt %, of the ink composition). Such dispersants may, in addition to the 30 to 50 wt % of the dispersant, comprise an organic medium (e.g. an aliphatic component with a boiling point of 220 to 280° C.).

Suitable amine-based polymeric components are described in U.S. Pat. No. 8,167,992 B2, the content of which is incorporated herein by reference in its entirety. For example, the amine-based polymeric component may be a compound of formula (1), or a salt thereof:

$$U-(Y)x-T-N(G)r-(B-Z)q \quad \text{(Formula 1)}$$

wherein
U is independently
R'-N-(C)-T'-O-, or
R-O-;
R or R' may be the same or different and are independently H or C1-50-optionally substituted hydrocarbyl, or hydrocarbonyl group (acyl group), or the residue of an epoxide, or the residue of an optionally substituted (meth) acrylic ester or amide group;
Y is C2-4-alkyleneoxy;
T or T' is independently C2-4 alkylene;
B is an alkylene group, such as, methylene;
Z is an inorganic acidic polar head group, such as, a sulphur or phosphorus acidic polar head group;
G and G' may be the same or different and are independently H or C1-50-optionally substituted hydrocarbyl or C1-50-optionally substituted hydrocarbyl or hydrocarbonyl group or the residue of an epoxide, or the residue of an optionally substituted (meth) acrylic ester or amide group;
r is zero or 1;
q is 1 or 2, with the proviso that when q is 2, r is zero; and
x is from 2 to 90.

Specific examples of suitable amine-based polymeric dispersants include:
Solsperse 13940 available from Lubrizol, which is a 40% active amine-based polymeric dispersant in a 240/260 (oC) aliphatic distillate;
Solsperse J965 available from Lubrizol, which is a 100% active polymeric dispersant
Solsperse 11200 available from Lubrizol, which is a 50% active polymeric dispersant in SHELLSOLTM D40;
Solsperse 21000 available from Lubrizol, which is a 100% active polymeric dispersant;
Hypermer KD1 available from Croda, which is a 100% active cationic polymeric dispersant;
Hypermer KD4 available from Croda, which is a 100% active anionic polymeric dispersant; and
Hypermer KD9 available from Croda, which is a 100% active anionic polymeric dispersant.

Solsperse 13940 is preferred as the amine-based polymeric dispersant.

The present inventors have found that an amine-based polymeric dispersant (e.g. the amine-based polymeric dispersant described above), when used in combination with the other components of the ink composition described herein and in the amounts described herein, has advantages in that it improves the repeatability of the advantageous results demonstrated by the ink compositions of the invention.

Preferred ink compositions of the invention include those in which:
the semi-drying solvent in present an amount of 64 to 80 wt %, based on the total weight of the composition;
the pigment is present in an amount of 10 to 18 wt %, based on the total weight of the composition;
the alkyd resin is present in an amount of 5 to 9 wt %, based on the total weight of the composition; and
the amine-based polymeric dispersant is present in an amount of 5 to 9 wt %, based on the total weight of the composition.

Particularly preferred ink compositions include those in which:
the semi-drying solvent in present an amount of 70 to 75 wt %, based on the total weight of the composition;
the pigment is present in an amount of 13 to 15 wt %, based on the total weight of the composition;
the alkyd resin is present in an amount of 6 to 8 wt %, based on the total weight of the composition; and
the amine-based polymeric dispersant is present in an amount of 6 to 8 wt %, based on the total weight of the composition.

The ink composition of the present invention as described herein can be applied to a substrate by inkjet printing to form a printed image on the substrate. Suitable substrates include Kraft substrates, such as Kraft paper and Kraft board. Suitable printed images include optically-readable codes, such as a 1D or 2D optically-readable code. The substrate carrying the printed image may constitute a printed article. The printed article may be an item of packaging, such as a box or an envelope.

The general process of inkjet printing is well known to a skilled person. Having described the ink composition of the present invention herein, a skilled person can therefore readily apply the ink to a suitable substrate in an inkjet printing method, based on their common general knowledge.

General methods of forming ink compositions are well known to the skilled person. Having described the ink composition of the present invention herein, a skilled person can therefore readily carry out a method of forming the ink compositions of the invention.

For example, a method of manufacturing an ink composition according to the present invention comprises: providing a semi-drying solvent, a pigment, an alkyd resin, and a dispersant, wherein the alkyd resin is provided in an amount of 5 wt % or more, based on the total weight of the composition; and the dispersant is provided in an amount of 5 wt % or more, based on the total weight of the composition.

The invention is illustrated below by means of the following non-limiting examples.

EXAMPLES

Suitability for Inkjet Printing

Inks having the compositions set out in Table 1 (Examples 1 to 3) and Table 2 (Comparative Examples 1 to 7) below were prepared according to the following procedure.

Step 1: The liquid components, i.e. all components except pigment, which are listed in Table 1 or 2 below, were added to a mixing vessel and then blended together using a mechanical stirrer equipped with a toothed wheel mixing impeller, such as an Eiger Torrance HSD Lab mixer. Blend speed 1000 rpm and time 5 minutes.

Step 2: The pigment was added to the blended oil phase mix and then wetted out under vacuum (Vacuum pressure less than −500 mbar), using a mechanical stirrer as before, to disperse the pigment. Wetting removes air and moisture from the pigment surface ensuring uniform dispersion. Wetting speed 1000 rpm and time 30 minutes.

Step 3: The wetted mix was then pre-mixed on a mechanical stirrer as before, to reduce and equalise the particle size of the dispersed pigment, so that the mix was suitable for milling. Premix time 30 minutes, premix vacuum less than −500 mbar and premix speed 3000 rpm.

Step 4: The premix was then transferred to a horizontal bead mill and milled to reduce the pigment particle size further. Mills of the Netzsch Minizeta type are suitable, using cerium stabilised zirconium beads with a size of 0.4-0.7 mm. The loading of the beads in the mill chamber should be greater than 85% by volume. The mill should be cooled with cold water to maintain a mix temperature of less than 50° C. Milling speed 3000 rpm and time 2 hours.

Step 5: The resulting ink mix was then tested for viscosity and particle size. Cone and plate viscometers of the Brookfield type DV3T and Dynamic Light Scattering particle size instruments of the Malvern Zetasizer Nano-ZS types are suitable.

Step 6: The ink was then filtered through a glass fibre filter system. A Pall vacuum filter system is suitable using Whatman GF/B filter discs. Pore size of the discs 1µ and vacuum pressure less than −800 mbar.

Ink compositions were analysed for properties relevant to their suitability for inkjet printing, including stability of the ink, viscosity of the ink, print density, particle size, and ability to filter the compositions.

Compositions suitable for inkjet printing were graded with "Excellent" or "Good". Compositions unsuitable for inkjet printing were graded with "Not Good" or "Poor".

Amounts of components shown in Tables 1 and 2 are weight percentages. The components used and analysis outcomes are as follows:

Methyl ester: Mosselman oil (Soy based oil)
Carbon black: Regal 400R
Alkyd resin: Vilkyd 782
Polymeric dispersant: Solplus K 200
Amine-based polymeric dispersant: Solsperse 13940

TABLE 1

| Component | Ex. 1 | Ex. 2 | Ex. 3 |
|---|---|---|---|
| Methyl ester | 80.0 | 76.0 | 72.0 |
| Carbon black | 10.0 | 12.0 | 14.0 |
| Alkyd resin | 5.0 | 6.0 | 7.0 |
| Amine-based polymeric dispersant | 5.0 | 6.0 | 7.0 |
| TOTAL | 100.0 | 100.0 | 100.0 |
| Physical stability | Good | Good | Good |
| Viscosity | Good | Good | Good |
| Optical density | Good | Good | Excellent |
| Analysis | Good | Good | Excellent |

TABLE 2

| Component | CE1 | CE2 | CE3 | CE4 | CE5 | CE6 | CE 7 |
|---|---|---|---|---|---|---|---|
| Methyl ester | 88.0 | 88.8 | 85.1 | 81.3 | 79.4 | 84.0 | 84.0 |
| Carbon black | 6.0 | 6.0 | 8.0 | 10.0 | 12.5 | 8.0 | 8.0 |
| Alkyd resin | 0.8 | | | | | 4.0 | 8.0 |
| Polymeric dispersant | 5.2 | | 6.9 | 8.7 | 8.1 | | |
| Amine-based polymeric dispersant | | 5.2 | | | | 4.0 | |
| TOTAL | 100.0 | 100.0 | 100.0 | 100.0 | 100.0 | 100.0 | 100.0 |
| Physical stability | Good | Poor | Poor | Good | Poor | Good | Poor |
| Viscosity | Low | Low | Low | Good | N/A | Low | Good |
| Optical density | N/A | N/A | N/A | Low | N/A | N/A | Good |
| Analysis | Not good | Not good | Not good | Not good | Not good | Not good | Not good |

The ink compositions of Examples 1 to 3 were found to have good stability and viscosity and optical density, and generally be suitable for inkjet printing, especially for optically-readable code printing. The ink composition of Comparative Examples 1 to 7 were found to be unsuitable for inkjet printing.

Repeat batches of Example 3 were prepared and tested for suitability for inkjet printing in the same way as the original batch. Results for the repeat batches of the composition of Example 3 were found to be consistent with the original batch.

Barcode Readability Tests

A barcode (9 digit, a range of 20% and 25% bar width reduction) was printed using the ink composition of Example 3 on various types of Kraft substrate (180 gsm recycled Kraft, 140 gsm recycled Kraft, Pallet cover board, and 180 gsm virgin Kraft paper). The barcode was tested for readability, and was found to be readable in each case.

These results show the capability of ink compositions of the present invention to cope with a range of ink spread situations, on a range of substrates, and achieve robust bar code readability.

Environmental Tests

Ink compositions of the present invention are subjected to testing for readily or inherent biodegradability of substances (OECD Guidelines 301B and 301F).

Kraft board printed with the ink composition of the present invention is subjected to testing according to standards ISO 14855 (biodegradability assay), and ISO 16929 (disintegration assay), as well as composition analysis & ecotoxicity testing (compost quality).

The invention is described above with reference to certain embodiments. However, those embodiments are merely illustrative and a skilled person will appreciate that various modifications are possible, including combinations of features which are described above with reference to separate embodiments, without departing from the scope of the invention.

The invention claimed is:

1. An ink composition, comprising:
   a semi-drying solvent;
   a pigment;
   an alkyd resin; and
   an amine-based polymeric dispersant,
   wherein the composition comprises 5 wt % or more of the alkyd resin, based on a total weight of the composition,
   wherein the composition comprises 5 wt % or more of the amine-based polymeric dispersant, based on the total weight of the composition, and
   wherein the composition comprises the semi-drying solvent in an amount of 64 to 80 wt %, based on the total weight of the composition.

2. The ink composition according to claim 1, wherein the composition comprises both the alkyd resin and the amine-based polymeric dispersant in the same amount.

3. The ink composition according to claim 1, wherein the composition comprises the alkyd resin in an amount of 7 wt % or more, based on the total weight of the composition.

4. The ink composition according to claim 1, wherein the composition comprises the amine-based polymeric dispersant in an amount of 7 wt % or more, based on the total weight of the composition.

5. The ink composition according to claim 1, wherein the semi-drying solvent has an iodine value of 120 to 150.

6. The ink composition according to claim 1, wherein the semi-drying solvent comprises a first ester, which is an ester of a di-unsaturated fatty acid and a monohydric alcohol.

7. The ink composition according to claim 6, wherein the composition comprises the first ester in an amount of 32 wt % or more, based on the total weight of the composition.

8. The ink composition according to claim 1, wherein the pigment is a black pigment.

9. The ink composition according to claim 1, wherein the alkyd resin comprises a second ester, which is an ester of a di-unsaturated fatty acid and a polyhydric alcohol.

10. The ink composition according to claim 1, wherein the composition comprises the semi-drying solvent in an amount of 70 to 75 wt %, based on the total weight of the composition.

11. The ink composition according to claim 1, wherein the composition comprises the pigment in an amount of 10 to 18 wt %, based on the total weight of the composition.

12. A method of manufacturing an ink composition, comprising:
providing a semi-drying solvent, a pigment, an alkyd resin, and a amine-based polymeric dispersant, to form the composition;
wherein
the alkyl resin is provided in an amount of 5 wt % or more, based on a total weight of the composition; and
the amine-based polymeric dispersant is provided in an amount of 5 wt % or more, based on the total weight of the composition,
wherein the composition comprises the semi-drying solvent in an amount of 64 to 80 wt %, based on the total weight of the composition.

13. The method according to claim 12, wherein the composition comprises the semi-drying solvent in an amount of 70 to 75 wt %, based on the total weight of the composition.

14. The ink composition according to claim 1, where the semi-drying solvent comprises an ester.

15. The ink composition according to claim 1, wherein the composition comprises 5 to 9 wt % or more of the alkyd resin, based on the total weight of the composition.

16. The ink composition according to claim 1, wherein the composition comprises 5 to 9 wt % or more of the amine-based polymeric dispersant, based on the total weight of the composition.

17. The ink composition according to claim 15, wherein the composition comprises the pigment in an amount of 10 to 18 wt %, based on the total weight of the composition.

18. The ink composition according to claim 1, wherein the semi-drying solvent comprises a methyl ester.

19. The ink composition according to claim 1, where the semi-drying solvent consists of one or more esters.

* * * * *